March 17, 1959 L. C. RICH ET AL 2,878,435
SERVOSYSTEM WITH LOW IMPEDANCE STABILIZATION NETWORK
Filed Oct. 19, 1956 2 Sheets-Sheet 1

INVENTORS
LEWIS C. RICH
LOTHAIR H. ROWLEY
BY
ATTORNEY

March 17, 1959 L. C. RICH ET AL 2,878,435
SERVOSYSTEM WITH LOW IMPEDANCE STABILIZATION NETWORK
Filed Oct. 19, 1956 2 Sheets-Sheet 2

INVENTORS
LEWIS C. RICH
LOTHAIR H. ROWLEY
BY
*Victor D. Borst*
ATTORNEY

United States Patent Office 2,878,435
Patented Mar. 17, 1959

2,878,435

SERVOSYSTEM WITH LOW IMPEDANCE STABILIZATION NETWORK

Lewis C. Rich, Queens, and Lothair H. Rowley, Syosset, N. Y., assignors to Sperry Rand Corporation, Ford Instrument Co. Division, Long Island City, N. Y., a corporation of Delaware Application October 19, 1956, Serial No. 617,072

8 Claims. (Cl. 318—32)

This invention relates to closed loop servo mechanism systems and more particularly to a feedback stabilization network operating in a low impedance circuit.

Passive networks for stabilization of a closed loop servo mechanism are commonly employed in the forward path of the servo amplifier component. These networks can be used to modify the character of feedback, for example, a differentiating network in cascade with a tachometer will interject a function of acceleration to the system.

The conventional stabilization network is normally applicable where the load impedance on the network is high compared to the output impedance of the network. Accordingly, these networks commonly feed the grid of a vacuum tube amplifier. A problem is encountered when it is desirable to employ a magnetic amplifier in the servo mechanism loop since the input winding is then of a relatively low impedance. Conventional networks would normally require circuit elements of prohibitive sizes for such a low impedance loading.

As presently contemplated in the embodiments of this invention, there is provided in the servo amplifier a feedback circuit including a pick-off winding inductively related to the output circuit of a pulsating D. C. magnetic amplifier. The output of the amplifier is connected to a D. C. motor in which either the armature current or the field flux is held constant so that the motor torque is directly proportional to only one of these two inputs. Among the motors having such a characteristic are split-field series motors and separately excited shunt motors. When a split-field series motor is energized by a balanced magnetic amplifier, the connecting leads pass in opposite winding sense through the window of the magnetic core associated with the pick-off winding.

The current induced in the feedback circuit which controls the servo amplifier along with the output of the differential device will be directly proportional to the acceleration plus the rate of acceleration change of the mechanical system connected to shaft of the motor. The magnitude of each of these components affected is determined by the selected impedance or resistance loading of the feedback circuit. If the pick-off winding is short circuited, the transformer will act as a current transformer and the current in the output is proportional to essentially only the acceleration of the motor.

The features of the invention will be understood more clearly from the following detailed description taken in conjunction with the accompanying drawings, in which.

Figure 3:
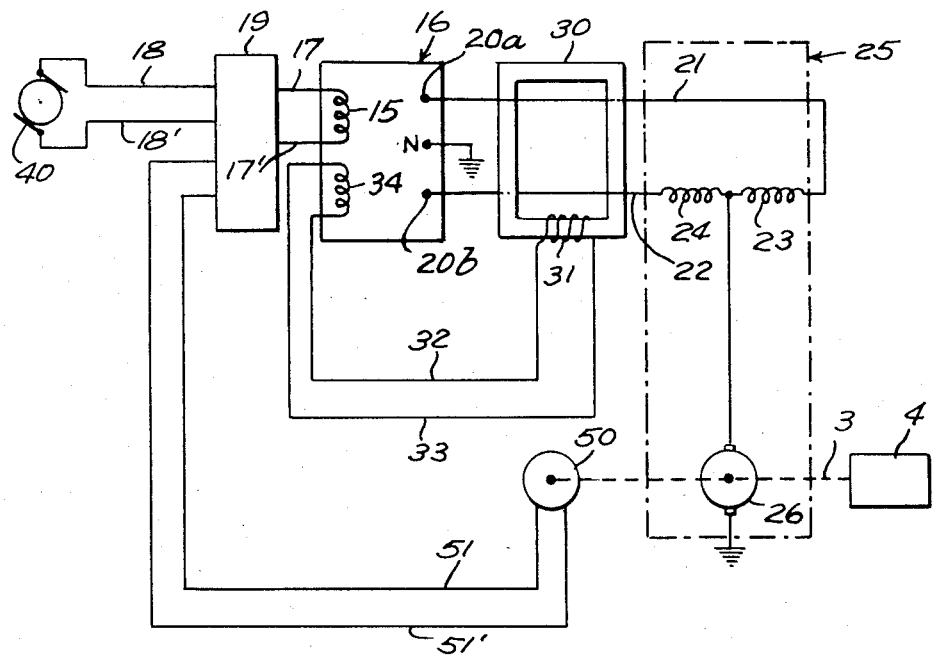
Figure 4:
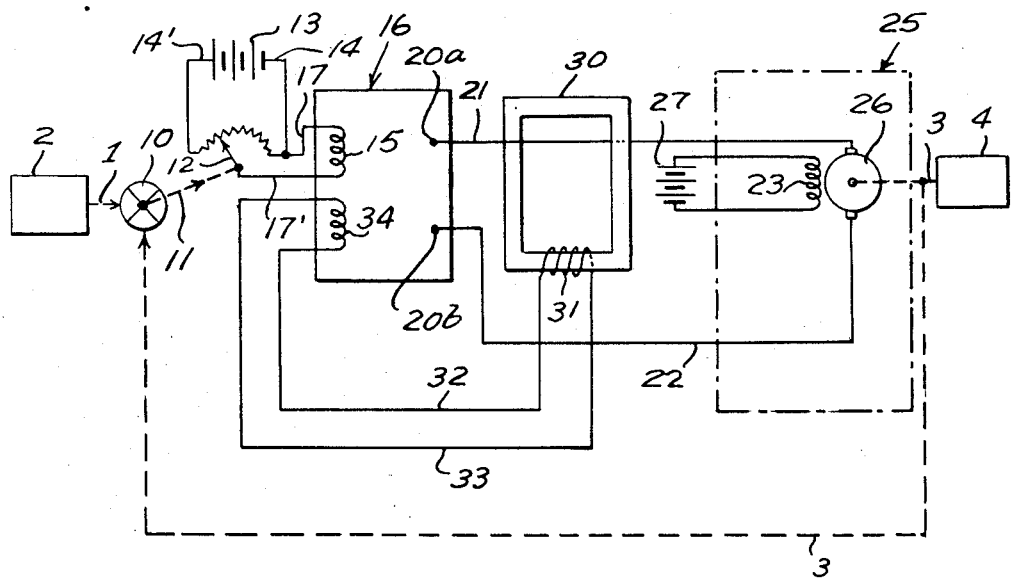

Fig. 3 is a schematic diagram of a closed loop electrical differential servo mechanism velocity system employing a split-field D. C. series motor with a feedback circuit to improve stability; and Fig. 4 is a modified schematic diagram of Fig. 1 employing a separately excited D. C. shunt motor.

Figures 1, 2:
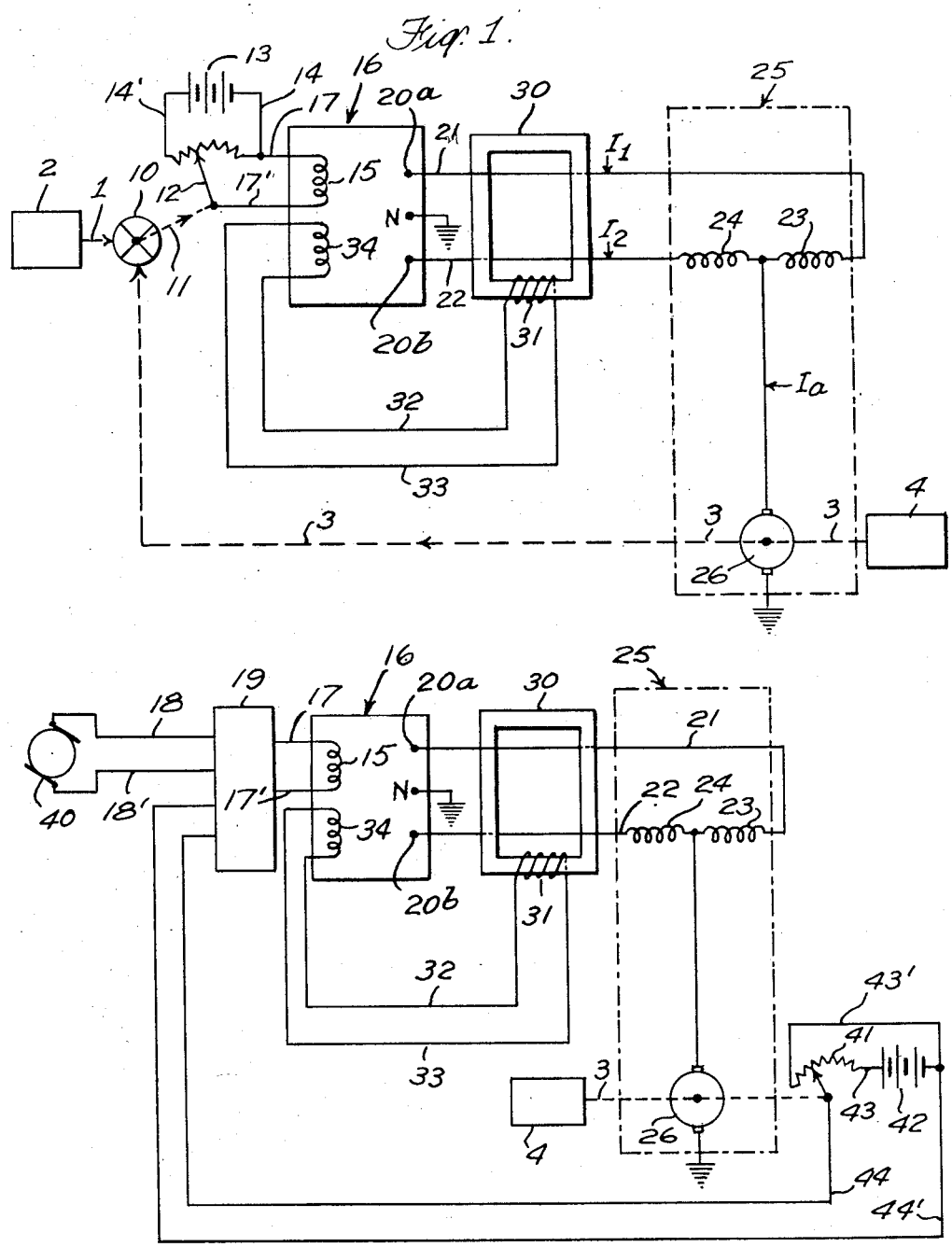
Fig. 1 is a schematic diagram of a closed loop mechanical differential servo mechanism position system employing a split-field D. C. series motor with a feedback circuit to improve stability.
Fig. 2 is a modified schematic diagram of Fig. 1 employing an electrical differential network.

Referring to the stabilized position system of Fig. 1 in which a mechanical displacement of shaft 1 by a driving device 2 results in a corresponding mechanical displacement of an output shaft 3 connected to a driven device 4, a differential transmission 10 as one input gear connected to the shaft 1 and its other input gear connected to the output shaft 3. The differential gear of the differential transmission is connected by output shaft 11 to drive a potentiometer 12 which is connected by a pair of conductors 14 and 14' across a reference voltage 13. The variable voltage of the potentiometer 12 which is directly proportional to the displacement of the differential shaft 11 is connected to an input winding 15 of a balanced magnetic amplifier 16 by a pair of conductors 17 and 17'. The magnetic amplifier 16 is a direct current controlled unit with differential output, such as the multi-stage amplifier system shown in Patent No. 2,767,372. The potential terminals $20^a$ and $20^b$ of the balanced output of the amplifier 16, the neutral terminal N being grounded, are connected by leads 21 and 22 to the two field windings 23 and 24, respectively, of D. C. split-field series motor 25 having a ground potential connected to its armature 26. The shaft of the motor 25 drives the shaft 3 and the output device 4 connected thereto. A magnetic core 30 is inductively related to the output circuit of the amplifier 16 by passing the output leads 21 and 22 through the window of core 30, in opposite winding sense. A pick-off winding 31 disposed on the core 30 is connected by leads 32 and 33 to a second input winding 34 of amplifier 16 and this feedback circuit provides stabilization to the closed loop servomechanism system, the feedback current being applied on the reset cycle during operation of the amplifier.

To simplify the technical explanation of the influence of the feedback circuit on the system, the following symbolism will be employed:

$I_1$ is the current in lead 21 flowing from the magnetic amplifier 16 towards the field winding 23
$I_2$ is the current in the lead 22 flowing from the magnetic amplifier 16 towards the field winding 24
$I_a = I_1 + I_2$ is the armature current
$\phi$ is the flux in magnetic core 30
$\phi_m$ is the flux in motor 25
$I$ = moment of inertia of system reflected to shaft 3
$\alpha$ = angular acceleration of shaft 3
$N_p$ = number of turns on pick-off winding 31
$V_p$ = voltage across pick-off winding 31
$I_p$ = current flowing in pick-off winding 31

The flux $\phi$ produced by currents $I_1$ and $I_2$ in the core 30 is proportional to the M. M. F. as determined by $NI_1 - NI_2$ where the number of turns N is the same for both windings, the flux $\phi$ being proportional to $I_1 - I_2$.

The field strength $\phi_m$ in the motor is directly proportional to $I_1 - I_2$ when its field structure is unsaturated. The D. C. split-field series motor and the magnetic amplifier are designed to maintain the armature current $I_a = I_1 + I_2$ at a constant value until the motor field structure is saturated and for such area of operation the torque of the motor is directly proportional to $I_1 - I_2$ and to $\phi$. After the motor field structure becomes saturated, $\phi_m$ becomes substantially constant and the armature current $I_a$ then varies directly with the flux $\phi$. As the acceleration of the output shaft 3 is directly proportional to the torque of the motor for a constant moment of inertia, the flux $\phi$ in the core 30 is directly proportional to $\alpha$. The voltage $V_p$ generated in the pick-off winding 31 is equal to $$V_p = N_p \frac{d\phi}{dt} \times 10^{-8}$$

or $V_p$ is directly proportional to rate of change of acceleration.

If the pick-off winding is short circuited, the transformer will act as a current transformer, the current being proportional to acceleration. If the circuit connected to the pick-off winding is a resistive load but not necessarily high impedance, the output is a combination of an acceleration term plus a rate of change of acceleration term. By selection of circuit elements, the required aspects of system stabilization can be interjected by the feedback circuit into the input of the servo amplifier.

The explanation of the magnetic core flux stabilization is as follows:

The torque of the motor is proportional to the armature current, $I_1+I_2$, multiplied by the motor field current $I_1-I_2$.

The flux in the magnetic core is directly proportional to $I_1-I_2$. The amplifier is designed to hold $I_1+I_2$ constant as the currents change until the field structure of the motor is saturated. At this point $I_1$ or $I_2$ has become substantially zero and remains so as the other current increases. Now the motor torque is proportional to only the armature current $I_1+I_2$ or since one current is substantially zero the motor torque is proportional to $I_1+0$ or $I_2+0$. The flux in the magnetic core is still proportional to $I_1-I_2$ or since one of the currents is substantially zero, the flux is proportional to $I_1$ or $I_2$. Thus over the whole range the flux in the magnetic core is proportional to motor torque over the entire range.

For the stabilized position servo mechanism system described in Fig. 2, a signal from a D. C. voltage source 40 is applied across conductors 18 and 18' which feeds one input to a differential resistance network 19. The shaft 3 connected to the motor 25 will displace in direct proportion to the magnitude of the voltage source 40. In order to simplify the understanding of the embodiments of the invention, like reference numbers will be used to identify corresponding elements in all figures. The shaft 3 also drives a potentiometer 41 which is connected across a voltage source 42 by conductors 43 and 43'. The voltage output of potentiometer 41 is directly proportional to the displacement of the shaft 3 and this voltage is impressed upon the second input of the differential network 19 by conductors 44 and 44'. The differential output of network 19 is connected across the input winding 15 of the magnetic amplifier 16 by the conductors 17 and 17'. The stabilizing feedback network comprising leads 21 and 22, core 30, pick-off winding 31 and conductors 32 and 33 connecting to the input winding 34 of amplifier 16 is identical with that disclosed in Fig. 1.

For the stabilized velocity servo mechanism system disclosed in Fig. 3, the velocity of the shaft 3 is directly proportional to the voltage of the D. C. signal source 40. Connected to shaft 3 is a D. C. tachometer 50 which generates a voltage proportional to the speed of the motor 25. The tachometer 50 is connected to the differential network 19 by conductors 51 and 51' so that its voltage acts differentially in relation to the signal voltage from source 40. The stabilization feedback network is similar to that disclosed in Fig. 1.

Fig. 4 is similar to Fig. 1 with the substitution of a D. C. separately excited shunt motor 25 for the split-field series motor employed in Fig. 1. Leads 21 and 22 connect the potential terminals 20a and 20b of magnetic amplifier 18 to the armature 26 of shunt motor 25. The lead 21 passes through and the lead 22 by-passes the window of the core 30. The field winding 23 of shunt motor 25 is connected across a constant D. C. source 27. With a constant field flux in the shunt motor 25, the flux $\phi$ induced in core 30 is directly proportional to the acceleration of the shaft 3. Hence the voltage induced in the pick-off winding 31 is directly proportional to the rate of acceleration change of the shaft 3. The current flowing in conductors 32 and 33 contains components of acceleration and rate of acceleration as determined by the impedance loading of the feedback circuit.

It is to be understood that various modifications of the invention other than those above described may be effected by persons skilled in the art without departing from the principle and scope of the invention as defined in the following claims.

What is claimed is:

1. A closed loop servo mechanism system comprising a differential input device, means for introducing a control signal into one side of said device, a balanced magnetic amplifier connected to said device and partially controlled thereby, an output circuit connected to said amplifier, said output circuit including an armature winding of a motor which is connected to the other input side of said device, said motor having a torque characteristic proportional to the current flowing in the said output circuit, a magnetic core disposed in inductive relationship to the output circuit whereby the flux induced therein is directly proportional to the torque of the said motor and a feedback circuit having a pick-off winding inductively disposed on said magnetic core, said feedback circuit having an operative connection with said amplifier so as to establish a second partial control thereof, whereby the components of acceleration and change of acceleration of the motor shaft are employed to stabilize said servo-mechanism system.

2. A closed loop servomechanism system as claimed in claim 1 wherein the said differential device is a mechanical differential with two input shafts and a differential shaft.

3. A closed loop servomechanism system as claimed in claim 1 wherein the motor connection to said differential device includes a tachometer.

4. A closed loop servomechanism system as claimed in claim 1 wherein said motor is a split-field D. C. series motor, the said amplifier is a balanced amplifier with a centertapped output winding and the said output circuit includes a neutral lead and two potential leads, the said two potential leads being connected to the two field windings of the said split-field winding D. C. series motor, each of said potential leads having a winding arranged on the magnetic core, said windings being oppositely poled.

5. A closed loop servomechanism system as claimed in claim 1 wherein the differential device is an impedance network.

6. A closed loop servomechanism system as claimed in claim 5 wherein the said amplifier has two input windings, one of said input windings being connected to the said impedance network and the second of said input windings being in said feedback circuit.

7. A closed loop servomechanism system as claimed in claim 1 wherein the said motor is a separately excited D. C. shunt motor and the said output circuit includes two leads, said leads being inductively related to the said magnetic core and connected to said motor.

8. A closed loop servo mechanism system as claimed in claim 2 wherein the motor is a split-field series motor and the motor split-field windings are disposed in said output circuit.

References Cited in the file of this patent

UNITED STATES PATENTS

| | | |
|---|---|---|
| 2,508,082 | Wald | May 16, 1950 |
| 2,732,520 | Counalt | Jan. 24, 1956 |
| 2,768,345 | Ogle et al. | Oct. 23, 1956 |

OTHER REFERENCES

M. G. Say: Magnetic Amplifiers and Saturable Reactors, George Newnes Limited, London, 1954, pp. 65 and 93.